United States Patent [19]

Gomez

[11] Patent Number: 4,515,533

[45] Date of Patent: May 7, 1985

[54] CLUTCH LEVER RETAINING MECHANISM

[76] Inventor: Abelicio Gomez, 5738 Wood Dr. SW., Albuy, N. Mex. 87615

[21] Appl. No.: 580,978

[22] Filed: Feb. 16, 1984

[51] Int. Cl.³ .......................... F04B 49/10; F04B 9/00
[52] U.S. Cl. ................................. 417/319; 192/114 R; 417/374
[58] Field of Search ............... 417/319, 364, 351, 374, 417/410, 313, 572; 192/114 R; 292/153

[56] References Cited

U.S. PATENT DOCUMENTS

| 500,796 | 7/1893 | Brocke. | |
| 1,167,509 | 1/1916 | MacDonald | 417/374 X |
| 1,182,707 | 5/1916 | Quade. | |
| 1,190,995 | 7/1916 | Gowder et al. | |
| 1,442,106 | 1/1923 | Terry | 192/114 R |
| 1,593,315 | 7/1926 | Story. | |
| 1,618,936 | 2/1927 | Lockwood. | |
| 2,149,262 | 3/1939 | Ahler | 192/114 R |
| 3,372,606 | 3/1968 | McGrath et al. | 192/114 X |
| 4,293,281 | 10/1981 | Lamoreaux | 417/374 X |

Primary Examiner—Edward K. Look
Attorney, Agent, or Firm—Donald J. Singer; Jacob N. Erlich

[57] ABSTRACT

A clutch lever retaining mechanism for preventing the inadvertent movement of a clutch lever, the retaining mechanism having a mounting bracket, an adjustable support bracket and a latch member pivotally mounted on the support bracket. The latch member has a notch therein which receives the clutch lever. A pin secures the latch member against movement. In use within a water pumping system having a clutch mechanism and clutch lever, the clutch lever retaining mechanism immobilizes the clutch lever in order to prevent inadvertent movement thereof.

8 Claims, 4 Drawing Figures

CLUTCH LEVER RETAINING MECHANISM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to clutch lever retaining mechanisms, and, more particularly, to a clutch lever retaining mechanism utilized in a water pumping system.

There are many instances in which it is necessary to interconnect elements by means of a clutch mechanism. In such cases the clutch mechanism is utilized to either engage or disengage a driving element from the driven element. An example of such a use for a clutch mechanism is in a water pumping system which includes a main driving element in the form of, for example, an electric motor and a secondary or auxiliary driving element in the form of, for example, a gas operated internal combustion engine. In normal operation the water pump of such a water pumping system is driven by the electric motor, but, in the event of a power failure in which the electric motor becomes inoperable a backup internal combustion engine can be used to keep the pump operational.

Normally, a clutch mechanism is provided between the water pump and the internal combustion engine so that the internal combustion engine can be preselectively disconnected from the pump when the pump is driven (i.e., under normal conditions) by the electric motor. There is no clutch connection between the pump and the electric motor since the electric motor is capable of turning along with the pump when there is a power failure or when the electric motor is inoperable. Generally, a clutch lever associated with the clutch mechanism is moved to a forward position for engaging the internal combustion engine or moved rearward for disengagement of the engine.

Unfortunately, it has been found that on numerous occassions the clutch elements of the clutch mechanism or, for that matter, even the entire clutch mechanism had to be replaced within a very few hours of actual operation because of clutch part failure while the internal combustion engine was on standby operation and the pump was driven by the electric motor. Consequently, when the internal combustion engine was called upon to act as a substitute for the electric motor, the clutch mechanism would not operate and therefore could not be utilized to engage the internal combustion engine with the pump.

Tests have shown that the damage to the clutch elements or parts was caused by the clutch lever inadvertently moving forward during normal operation, that is, while the electric motor was driving the pump. As a result thereof, the clutch plate would drag and thereby be damaged. In addition, if the clutch lever inadvertently moved rearward, the clutch bearing race would become worn.

It is therefore highly desirable and extremely beneficial if a clutch lever retaining mechanism could be provided on such a water pumping system. In addition, it would even be more desirable if such a clutch lever retaining mechanism could be adapted to be used with a variety of different types of water pumping systems and with clutch levers having different neutral positions.

SUMMARY OF THE INVENTION

The present invention overcomes the problems set forth in detail hereinabove by providing a clutch lever retaining mechanism which can be easily adapted for use with many types of water pumping systems so as to prevent any abnormal wearing of the clutch mechanism parts.

The clutch lever retaining mechanism of the present invention finds its major utility in use within a conventional water pumping system, however, it should be realized that the invention may be utilized with other clutch mechanisms. A typical water pumping system generally includes the following major components: a pump, an electric motor for driving the pump under normal operating conditions, a gas internal combustion engine for driving the pump when the electric motor is inoperable, as, for example, during a power failure, and a clutch mechanism interconnecting the gas internal engine to the pump so as to permit speedy and reliable engagement and disengagement of the gas internal combustion engine from the pump when desirable. Forming part of the clutch mechanism is a clutch lever which is utilized to either engage or disengage the internal combustion engine from the pump.

The clutch lever retaining mechanism forming the present invention is incorporated within the water pumping system by being attached to the clutch mechanism housing by means of an adjustable support bracket. Mounted on the support bracket is a latch member having a notch located therein suitably sized to engage the clutch lever. The latch member is pivotally secured to the bracket member at one end thereof and has a removable pin attached to the other end thereof to fixedly maintain the latch member in position against the clutch lever so as to prevent inadvertent movement thereof. When it is desirable to engage or disengage the internal combustion engine from the pump, one merely has to remove the pin and rotate the latch member away from the clutch lever so as to allow the movement of the clutch lever to take place.

Since the neutral position of the clutch lever may vary on a number of different types of clutch mechanisms, the support bracket of the clutch lever retaining mechanism is adjustable with respect to a stationary mounting bracket so that the notch located on the latch member may have its position varied in accordance with the neutral position of the clutch lever. In this manner the clutch lever retaining mechanism of the present invention will prevent wear of the clutch parts of a clutch mechanism which normally occurs when utilized in a water pumping system driven by an electric motor and auxiliary gas internal combustion engine. Since the clutch parts are difficult to obtain and operation by an auxiliary or back up motor such as a gas internal combustion engine is highly desirable, any worn parts can totally disrupt the use of the water pumping system by rendering inoperable the backup capability of the system.

It is therefore an object of this invention to provide a clutch lever retaining mechanism which is capable of retaining a clutch lever in a preselected position.

It is another object of this invention to provide a clutch lever retaining mechanism which is adjustable and can be utilized with a number of different types of clutch mechanisms.

It is still another object of this invention to provide a clutch lever retaining mechanism which allows for the easy engagement and disengagement of a clutch.

It is a further object of this invention to provide a clutch lever retaining mechanism which is economical to produce and which utilizes conventional, currently available components that lend themselves to standard mass producing manufacturing techniques.

For a better understanding of the present invention together with other and further objects thereof, reference is made to the following description, taken in conjunction with the accompanying drawings and its scope will be pointed out in the appended claims.

DETAILED DESCRIPTION OF THE DRAWINGS

DETAILED DESCRIPTION OF THE PREFERRED EMBODIMENT

Figure 1:
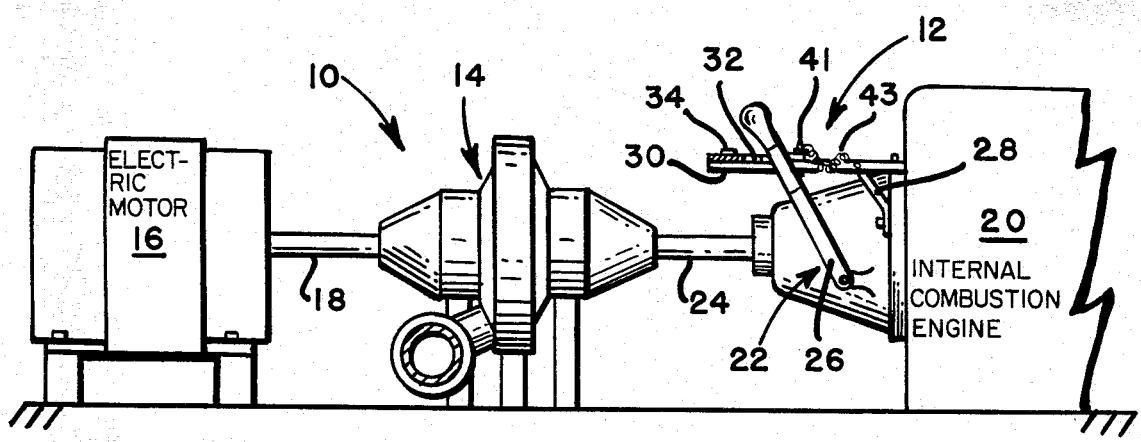
FIG. 1 is a side elevational view schematically illustrating a pumping system in which the clutch lever retaining mechanism of the present invention is utilized.

Reference is now made to FIG. 1 of the drawing which schematically illustrates a typical water pumping system 10 which includes as part thereof the clutch lever retaining mechanism 12 of the present invention. For a better understanding of the present invention, it is best to first understand the operation of the water pumping system 10 with which the present invention is preferably utilized. Water pumping system 10 incorporates therein a conventional water pump 14 such as a Peerless Pump manufactured by the AM Indianhead Company (model 4AD1812) normally operated by a conventional electric motor 16. Electric motor 16 may be a Marathon Electric Motor of, for example, 75 hp and which is interconnected to water pump 14 by means of shaft 18.

Under normal operation electric motor 16 drives water pump 14, however, in some instances, for example, when there is a power failure electric motor 16 is no longer capable of driving water pump 14 and therefore the entire water pumping system 10 becomes inoperable. To overcome this problem it has been found that a conventional gas internal combustion engine 20 can be operably connected by means of a clutch mechanism 22 and shaft 24 (the operation of which will be described in detail hereinbelow) to water pump 14. An example of such an internal combustion engine which is capable of operating pump 14 would be a Ford Internal Combustion Engine, Product No. 21491T-1-H. Consequently, when there is a power failure or an instance when electric motor 16 can no longer drive the water pump 14 then gas internal combustion gasoline engine 20 can be utilized to drive the water pump 14.

In order to accomplish this type of operation, a conventional clutch mechanism 22 interconnects the drive shaft 24 with the internal combustion engine 20. An example of such a conventional clutch mechanism 22 could be a Rockford clutch, Ser. No. 618,217. As schematically illustrated in FIG. 1 of the drawing, a clutch lever 26 is utilized to engage and disengage internal combustion engine 20 from the water pump 14. There is no clutch mechanism connection between water pump 14 and electric motor 16. Therefore, if the electric motor 16 becomes inoperable it will turn along with pump 14 as internal combustion engine 20 drives pump 14.

As stated hereinabove clutch lever 26 is generally moved to the forward position for engaging engine 20. In the disengaged position, however, it has been found that in many instances the clutch plates within clutch mechanism 22 drag and therefore becomes damaged. In addition, in some other instances it was found that the clutch bearing race would also become worn. Consequently, when it is necessary to engage the internal combustion engine 20, the worn parts of the clutch mechanism 22 prevent such engagement from taking place and therefore render the entire water pumping system 10 inoperable. It was found through extensive research that the inadvertent movement of the clutch lever 26 caused damage to the clutch plates or clutch bearing race to take place and therefore the present invention, in the form of a clutch lever retaining mechanism 12, has been included as part of the water pumping system in order to overcome this problem.

Figure 2:
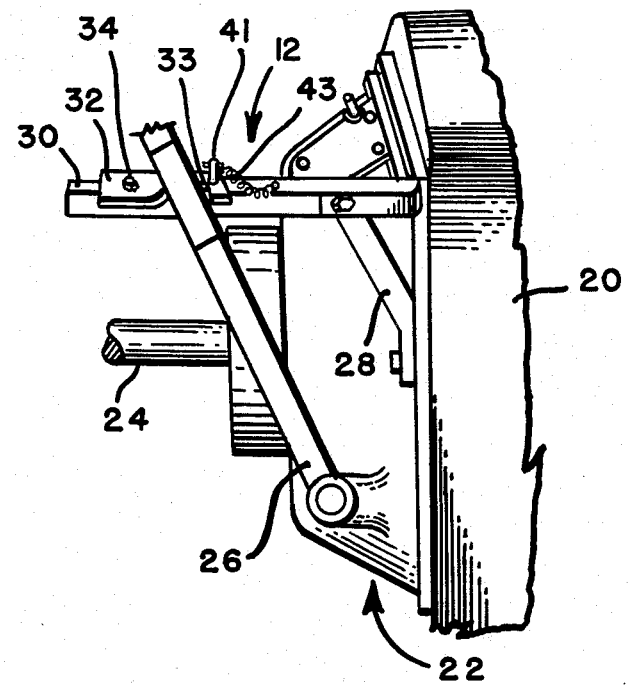
FIG. 2 is a pictorial representation of the clutch lever retaining mechanism of the present invention.

More specifically, the clutch lever retaining mechanism 12 as clearly illustrated in FIG. 2 of the drawing is preferably attached to the housing surrounding clutch mechanism 22. In its makeup, clutch lever retaining mechanism 12 includes the following elements: a mounting bracket 28, an adjustably mounted L-shaped supporting bracket 30 which is slidably mounted upon mounting bracket 28 in a manner to be described in greater detail hereinbelow, and a pivotally mounted latch member 32 which is rotatably attached to the support bracket 30 by means of a pin or bolt 34.

Figure 3:
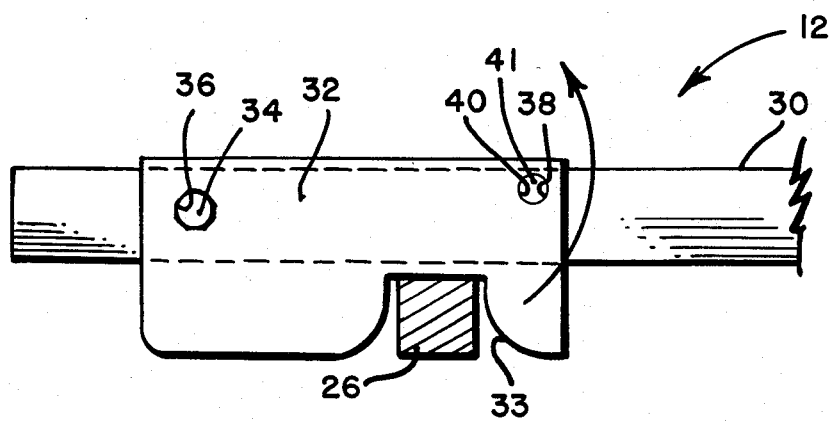
FIG. 3 is a plan view of a portion of the clutch lever retaining mechanism of the present invention illustrating in detail the latch member.
Figure 4:
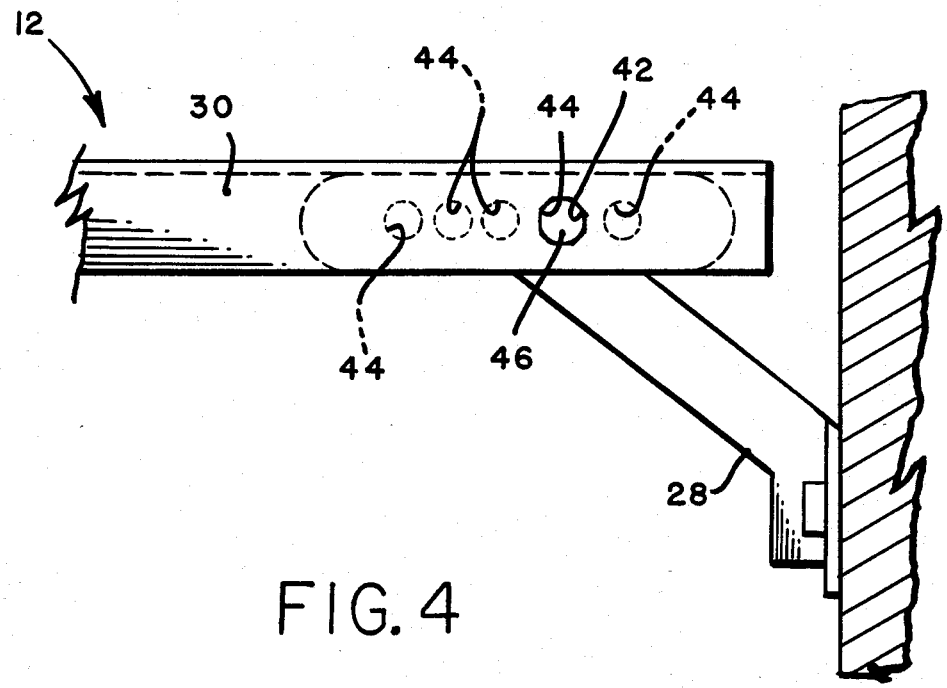
FIG. 4 is a side elevational view showing a portion of the clutch lever retaining mechanism of this invention and illustrating the adjustability feature of the present invention.

Reference is now made to FIG. 3 of the drawing which more clearly shows the latch member 32 in its position pivotally mounted upon adjustable support bracket 30, a portion of which is shown in the Figure. Latch member 32 has a notch 33 cut out adjacent one end thereof. In addition, latch member 32 has a first aperture 36 therein which allows for its pivotal attachment to support bracket 30 by means of a bolt 34 through an aligned aperture 36 in support bracket 30. A second aperture 39 is located in latch member 32 and is aligned in a locking position with an aperture 40 located in support bracket 30. When the latch member 32 is in its locking position as illustrated in FIG. 3 of the drawings a removable pin 41 may be inserted in the aligned apertures 39 and 40 so as to fixedly secure latch member 32 to support bracket 30. Pin 41 has a wire 43 attached between one end thereof and bracket 30 in order to prevent pin 41 from becoming lost when not inserted within apertures 39 and 40.

In the locking position clutch lever 26 is engaged by the notch 33 within latch member 32 so that movement of clutch lever 26 cannot take place. When it is desirable to move clutch lever 26 so that internal combustion engine 20 can engage pump 14, one merely has to remove pin 41 from within apertures 39 and 40 and move latch member 32 in the direction of the arrow shown in FIG. 3 thereby enabling clutch lever 26 to be moved to a position which allows the engagement of internal combustion engine 20 to take place.

In many instances, however, it has been found that the disengaged position of clutch lever 26 does not coincide with the disengaged position of a clutch lever of another water pumping system and therefore it is essential that mounting bracket 30 be adjustably mounted with respect to the supporting bracket 28. In this manner, latch member 32 will have its notch 34 capable of engaging clutch lever 26 in a variety of disengaged positions. Adjustability of the present invention is accomplished by providing a single aperture or opening 42 within support bracket 30 and a plurality of apertures or openings 44 within mounting bracket 28 so that a securing pin or bolt 46 may be inserted within two aligned openings 42 and 44 so as to lock bracket 30 in its appropriate and desirable position. In this manner the mounting bracket 28 can be easily affixed to clutch housing and bracket 30 can be easily adjusted with respect thereto so as to accommodate a variety of positions of clutch lever 26 when in a disengaged position. The L-shaped configuration of the support bracket enable the top surface thereof to rest on the top surface of the mounting bracket thereby maintaining the rigidity of retaining mechanism 12 at any one of the various adjustable positions thereof.

With the utilization of the clutch lever retaining mechanism 12 of the present invention, it is now possible to operate water pumping system 10 in a very reliable manner and with a substantial decrease in the replacement of inoperable or worn clutch mechanism parts. In addition, the clutch lever retaining mechanism 12 of the present invention can be used with a number of different types of water pumping systems 10 because of its adjustable feature. Furthermore, clutch lever retaining mechanism 12 can be removed when a water pumping system 10 is no longer needed. As a result the clutch lever retaining mechanism 12 can be used with many different types of water pumping systems.

Although this invention has been described with reference to a particular embodiment, it will be understood that this invention is also capable of further and other embodiments within the spirit and scope of the appended claims.

I claim:

1. In a pumping system having a pump, an electric motor operably connected to said pump for normally operating said pump, an internal combustion engine operably connected to said pump for operating said pump during nonoperation of said electric motor, a clutch mechanism operably interconnected between said pump and said internal combustion engine, and said clutch mechanism including a housing and a clutch lever for selectively engaging or disengaging said clutch mechanism, the improvement therein being in the form of a clutch lever retaining mechanism, said retaining mechanism comprising a mounting bracket secured to said clutch mechanism housing adjacent said clutch lever; a support bracket adjustably mounted on said mounting bracket; a latch member pivotally secured to said support bracket, said latch member having a notch therein, and being positioned such that said notch engages said clutch lever in a preselected position; and means interconnected between said support bracket and said latch member for selectively maintaining said latch member in said preselected position in order to prevent the movement of said clutch lever and for selectively releasing said latch member for movement to another position in which said clutch lever is free to move.

2. In a pumping system as defined in claim 1 wherein said mounting bracket has a plurality of openings therein and said support bracket has a single opening therein, said support bracket being slidable with respect to said mounting bracket in order to selectively align said openings in said mounting bracket with a preselected one of said openings in said support bracket, and a bolt capable of passing through said aligned openings to maintain said support bracket in a preselected position with respect to said mounting bracket.

3. In a pumping system as defined in claim 2 wherein said support bracket is L-shaped and the underside of the top surface thereof rests upon the top surface of said mounting bracket in order to maintain stability between said support bracket and said mounting bracket.

4. In a pumping system as defined in claim 3 wherein said means for maintaining said latch member in said preselected position comprises an aperture in said latch member, an aperture in said support bracket and a pin capable of being removably inserted through said apertures.

5. In a pumping system as defined in claim 4 wherein said latch member maintaining means further comprises means attached between said pin and said support bracket for movably securing said pin to said support bracket.

6. A clutch lever retaining mechanism comprising:
a mounting bracket, said mounting bracket having a plurality of spaced-apart openings therein;
an L-shaped support bracket, said support bracket having a single opening therein and slidably mounted with respect to said mounting bracket, the underside of the top surface of said L-shaped support bracket resting upon the top surface of said mounting bracket in order to maintain a stable relationship between said brackets;
a bolt capable of being inserted within said opening in said support bracket and an aligned one of said openings in said mounting bracket in order to secure said support bracket to said mounting bracket in a preselected position;
a latch member pivotally secured to the top surface of said L-shaped support bracket, said latch member having a notch therein, said notch having a preselected configuration whereby said notch is capable of engaging a clutch lever in a preselected position; and
means interconnected between said support bracket and said latch member for selectively maintaining said latch member in said preselected position of engagement with said clutch lever and for selectively releasing said latch member for movement to another position in which said clutch lever is free to move.

7. A clutch lever retaining mechanism as defined in claim 6 wherein said means for maintaining said latch member in said preselected position comprises an aperture in said latch member, an aperture in said support bracket and a pin capable of being removably inserted through said apertures.

8. A clutch lever retaining mechanism as defined in claim 7 wherein said latch member maintaining means further comprises means attached between said pin and said support bracket for movably securing said pin to said support bracket.

* * * * *